US010183658B2

(12) United States Patent
Tomchak et al.

(10) Patent No.: US 10,183,658 B2
(45) Date of Patent: Jan. 22, 2019

(54) COMBINED OIL AND WATER SEPARATOR IN AN AIR BRAKE DRYER

(71) Applicant: Parker-Hannifin Corporation, Cleveland, OH (US)

(72) Inventors: Thomas Martin Tomchak, Modesto, CA (US); Peter Popoff, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 415 days.

(21) Appl. No.: 14/925,002

(22) Filed: Oct. 28, 2015

(65) Prior Publication Data

US 2016/0114777 A1 Apr. 28, 2016

Related U.S. Application Data

(60) Provisional application No. 62/069,380, filed on Oct. 28, 2014.

(51) Int. Cl.
*B60T 17/00* (2006.01)
*B01D 46/00* (2006.01)
(Continued)

(52) U.S. Cl.
CPC ........ *B60T 17/004* (2013.01); *B01D 46/0031* (2013.01); *B01D 46/0036* (2013.01);
(Continued)

(58) Field of Classification Search
CPC .............. B01D 46/003; B01D 46/0031; B01D 46/0041; B01D 46/0043; B01D 46/0045; B01D 46/2414; B60T 17/004
See application file for complete search history.

(56) References Cited

U.S. PATENT DOCUMENTS 2,942,691 A * 6/1960 Dillon .................... B01D 45/08
55/318
3,257,783 A * 6/1966 Baker ................ B01D 46/0031
137/193
(Continued)

FOREIGN PATENT DOCUMENTS

CN 202129015 U 2/2012
DE 102005039059 B3 9/2006
(Continued)

OTHER PUBLICATIONS

Air Dryers DU, DR, and NX Series, Parker Hannifin Corporation, Racor Division, Feb. 2008, 2 pages.
(Continued)

*Primary Examiner* — Robert Clemente
(74) *Attorney, Agent, or Firm* — Renner, Otto, Boisselle & Sklar, LLP

(57) ABSTRACT

A filter assembly for separating and removing a liquid from a compressed fluid stream includes a filter element for separating the liquid from the fluid, a purge valve, and an elongated valve operator for actuating the purge valve. The top of the filter element has a shroud that decreases the flow area of the entering fluid stream to induce a vortex of the fluid, allowing the liquid to separate from the fluid. The purge valve is located at the bottom of the filter element for draining the separated liquid. The elongated valve operator axially extends through the filter element and is moveable by an actuating piston located at the top of the filter element, in response to elevated pressure in the filter assembly. The filtered air is dried through a desiccant body and then outputted from the filter assembly to be used in an air brake system.

19 Claims, 6 Drawing Sheets

(51) Int. Cl.
*B01D 53/26* (2006.01)
*B01D 46/24* (2006.01)
*B01D 53/04* (2006.01)
*F15B 21/04* (2006.01)

(52) U.S. Cl.
CPC ..... *B01D 46/0045* (2013.01); *B01D 46/2414* (2013.01); *B01D 53/0415* (2013.01); *B01D 53/261* (2013.01); *F15B 21/048* (2013.01)

(56) References Cited

U.S. PATENT DOCUMENTS

| | | | |
|---|---|---|---|
| 4,487,617 A | | 12/1984 | Dienes et al. |
| 4,816,047 A | * | 3/1989 | Neal .................... B01D 53/261 |
| | | | 55/475 |
| 6,641,633 B2 | | 11/2003 | Witengier |
| 6,730,143 B1 | | 5/2004 | Nichols et al. |
| 7,320,725 B2 | | 1/2008 | Arno et al. |
| 8,557,030 B2 | | 10/2013 | Fornof et al. |
| 8,657,939 B2 | | 2/2014 | Eidenschink et al. |
| 8,850,013 B2 | | 9/2014 | Waldman et al. |
| 2009/0025693 A1 | * | 1/2009 | Steinman ............... B01D 45/16 |
| | | | 123/518 |

FOREIGN PATENT DOCUMENTS

| | | |
|---|---|---|
| EP | 2127727 A1 | 12/2009 |
| FR | 2224211 A1 | 10/1974 |
| WO | 95/07831 A1 | 3/1995 |

OTHER PUBLICATIONS

Extended European Search Report for corresponding EP Application No. 15191744.0 dated Apr. 13, 2016.

* cited by examiner

COMBINED OIL AND WATER SEPARATOR IN AN AIR BRAKE DRYER

RELATED APPLICATIONS

This application claims the benefit of U.S. Provisional Application No. 62/069,380 filed Oct. 28, 2014, which is hereby incorporated herein by reference.

FIELD OF INVENTION

The present invention relates to vehicle air brake systems, and more particularly to air filters in vehicle air brake systems.

BACKGROUND OF THE INVENTION

Air brake systems are used in trucks or other heavy duty vehicles for providing "failsafe" vehicle brake operation. Generally, air brake systems have two modes of operating. The first mode is a failsafe mode used for the emergency brake function. The second mode is used under normal operation and compressed air to activate the braking mechanism. If a loss of compressed air pressure occurs, the failsafe mechanisms engage the brakes attempting to lock the wheels in position and stop the progress of the vehicle. Under normal operation, air that is compressed by a compressor in the vehicle is directed by the vehicle operator to actuators. The actuators are induced to move by the delivered compressed air. When the intended results are achieved and the braking function is no longer needed, the system exhausts the contained pressure within the actuator. The actuator returns to the original position and the braking mechanisms are disengaged. Thus, the compressed air provides and maintains air under pressure to the brakes to ensure failsafe vehicle brake operation.

The compressed air that leaves the compressor is typically not suitable to be supplied directly to the brake system for several reasons. The first reason is that the compressed air contains oil. The compressor is supplied with oil from the vehicle engine that is used for lubrication of bearings and other compressor components. Lubricating oil within the compressor is difficult to contain. It contaminates the compressed air stream delivered by the compressor. The second reason is that the compressor ingests humid air from the surrounding environment. The humid air is compressed and delivered by the compressor to the system.

Conventional air brake systems use a dryer located downstream of the air compressor to dry the pressurized air prior to delivery of the air to the brakes. The air is dried for efficiency and to prevent damage to the downstream components. However, the dryer typically houses a desiccant material that may become contaminated with the oil entrained in the compressed air. Thus, an improved filter assembly is desirable.

SUMMARY OF THE INVENTION

A filter assembly according to the present invention includes a centrifugal pre-separator for a filter element, within an air dryer. The centrifugal pre-separation is achieved using an interface between a manifold head, a filter element housing, and a filter element end cap. The endcap has a shroud at a top end of the filter element. The shroud is configured to radially accelerate air that has been compressed into a vortex while entering the filter assembly, allowing the oil and water to separate from the vortex. The filtered air enters a desiccant body and is dried before being outputted from the filter assembly for use in a brake system. The efficacy and the functional life of a desiccant medium of the filter assembly are improved when the oil is separated prior to reaching the desiccant medium.

A purge valve is also provided at a bottom end of the filter element for draining the separated oil and water from the filter assembly. The purge valve is actuated when a pressure signal is communicated from a compressor to a port in the filter assembly. The pressure signal activates an elongated valve operator axially extending through the filter element between the top end and the bottom end.

A filter element for separating a liquid from a compressed fluid stream that flows into the filter element includes a longitudinally extending body of coalescing media having a first end and a second end distally opposite the first end, and a first end cap having a central body portion fixed to the first end of the body of coalescing media. The first end cap also includes a shroud that extends longitudinally from the central body portion and has a radially outer annular surface that progressively increases in diameter from a first end of the shroud to a second end of the shroud in a direction toward the second end of the of body of coalescing media. The shroud is configured to reduce a flow area of the fluid stream flowing into the filter element to induce a vortex of the fluid around the body of coalescing media, allowing the liquid to separate from the vortex.

A filter element for separating and removing a liquid from a fluid includes a longitudinally extending body of coalescing media for separating the liquid from the fluid having a top end and a bottom end distally opposite the top end, and a purge valve assembly at the bottom end of the body of coalescing media. The purge valve assembly has a purge valve that is biased in a closed position and moveable to an open position to drain the liquid out of the filter assembly.

A filter assembly for separating and removing a liquid from a fluid includes a filter head having a fluid inlet and an actuating piston, a longitudinal filter element for separating the liquid from the fluid that has a first end in fluid communication with the fluid inlet and a second end distally opposite the first end, a purge valve at the second end of the filter element distally opposite the filter head that is biased in a closed position and moveable to an open position for draining the liquid out of the filter assembly, and an elongated valve operator that axially extends through the filter element between the first end and the second end and is configured to move the purge valve between the closed position and the open position. The actuating piston is configured to move the purge valve by acting on the valve operator, in response to elevated pressure in the filter assembly.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

The principles of the present invention have particular application in heavy duty vehicles such as trucks and work vehicles having air brake systems. The air brake system includes a compressor for pressurizing air through fluid lines that supply the fluid to brakes of the vehicle. The compressor is configured to generate a body of fluid containing air, oil, and water and is in fluid communication with a dryer assembly swirl chamber. The swirl chamber is in fluid communication with a filter assembly that separates the oil and bulk water from the body of fluid and dries the filtered air, such that clean and filtered air exits the filter assembly and is supplied to the brakes.

Figure 1:
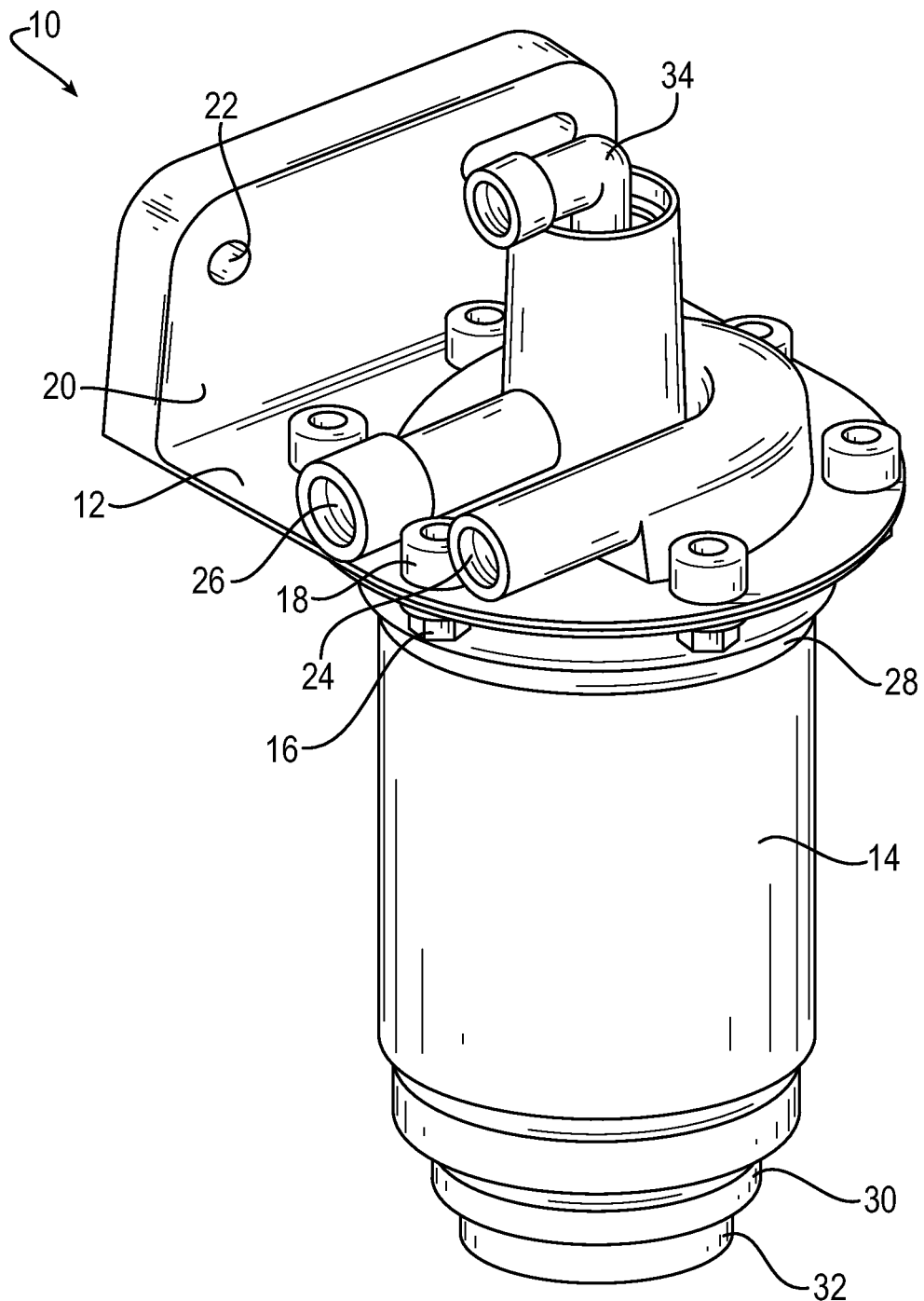
FIG. 1 is a drawing depicting a perspective view of a filter assembly.
Figure 2:
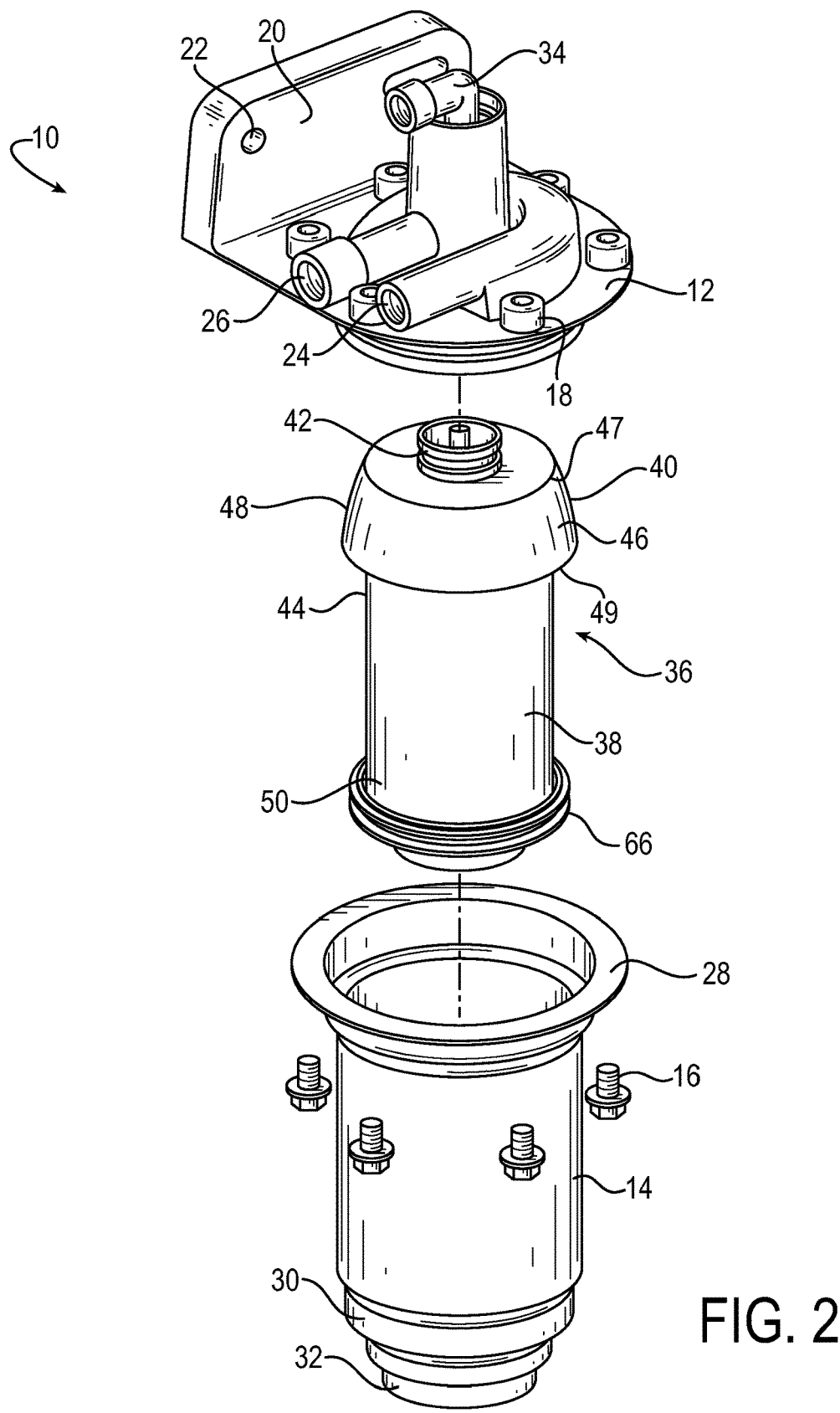
FIG. 2 is a drawing depicting an exploded view of the filter assembly in FIG. 1 showing a filter element.

Referring first to FIGS. 1 and 2, a filter assembly 10 is used in an air brake system. The exemplary filter assembly 10 may include a filter head 12 and a filter housing 14 attached to the filter head 12 via bolts 16 and bolt holes 18 formed in the filter head 12. The filter head 12 may be formed of a cast metal and may include a mounting portion 20 with mounting holes 22 that are slotted or round for mounting the filter assembly 10 within a vehicle (not shown). The filter head 12 defines a compressed fluid inlet 24 that is in fluid communication with a compressor (not shown) of the vehicle. The fluid inlet 24 may be spiral-shaped such that a compressed fluid stream of air containing oil and water enters the filter housing 14 from the fluid inlet 24. The filter head 12 also includes a fluid outlet 26 that outputs the filtered fluid, which generally is clean and dry air, from the filter assembly 10 to be used in operation of the brake system (not shown). The fluid outlet 26 is in sealed fluid communication with the brake system.

The filter housing 14 may be tubular with a first end 28 and a second end 30. The first end 28 is attachable to the filter head 12 and the second end 30 has a purge port 32 for draining the filtered oil and water from the filter assembly 10. The purge port 32 contains a purge assembly (described in more detail below) that is actuated in response to a governor control port 34 located in the filter head 12. The governor control port 34 governs the maximum pressure in the filter assembly 10 based on signals sent by the compressor of the vehicle. The compressor sends a signal that the amount of pressure entering the filter assembly 10 is at a maximum and the signal is conducted to the governor control port 34. The governor control port 34 further is configured to operate a piston that in turn opens the purge valve within the purge assembly. The open purge valve allows the fluid to drain from the filter assembly 10 and into the surrounding environment.

FIG. 2 is a drawing depicting an exploded view of the filter assembly 10 shown in FIG. 1. The filter assembly 10 includes a filter element 36 received in the filter housing 14 for separating the liquid from the compressed fluid. The filter element 36 may be a replaceable cartridge-style element, and has a longitudinally extending body of coalescing media 38. The filter element 36 may be easily removable from the filter housing 14 for servicing and replacement. The filter element 36 is inserted into the filter housing 14 such that the body of fluid is trapped between the filter housing 14 and the body of coalescing media 38. The oily and humid air from the body of fluid enters the body of coalescing media 38, allowing oil droplets and moisture to coalesce into larger droplets. As the oil and/or moisture droplets grow in size, the droplets form a layer separable from the fluid.

The filter element 36 may further include a first end cap 40 having a central body portion 42 that is attachable to the filter head 12 and fixed to a first end 44 of the body of coalescing media 38. The first end cap 40 includes a shroud 46 that extends longitudinally from the central body portion 42. The shroud 46 has a radially outer annular surface 48 that progressively increases in diameter from a first end 47 toward a second end 49 of the shroud 46. The body of coalescing media 38 further includes a second end 50 that is located distally opposite the first end 44. In the exemplary filter element 36, the first end 44 is a top end and the second end 50 is a bottom end. The annular surface 48 of the shroud 46 may be continuous and flare radially outwardly from the body of coalescing media 38 toward the filter housing 14. The shroud 46 is configured to reduce the flow area of the entering stream of compressed fluid from the spiral-shaped fluid inlet 24. The area reduction induces a vortex within the filter housing 14, allowing the liquid to separate from the vortex of air as the vortex of fluid swirls around the body of coalescing media 38. The spiral-shaped fluid inlet 24 and the shroud 46 induce the vortex which provides the centrifugal pre-separation of the liquid particles of oil and water. The oil and water are separated from the fluid prior to coalescing and further separated by the coalescing medium prior to desiccation.

Figure 3:
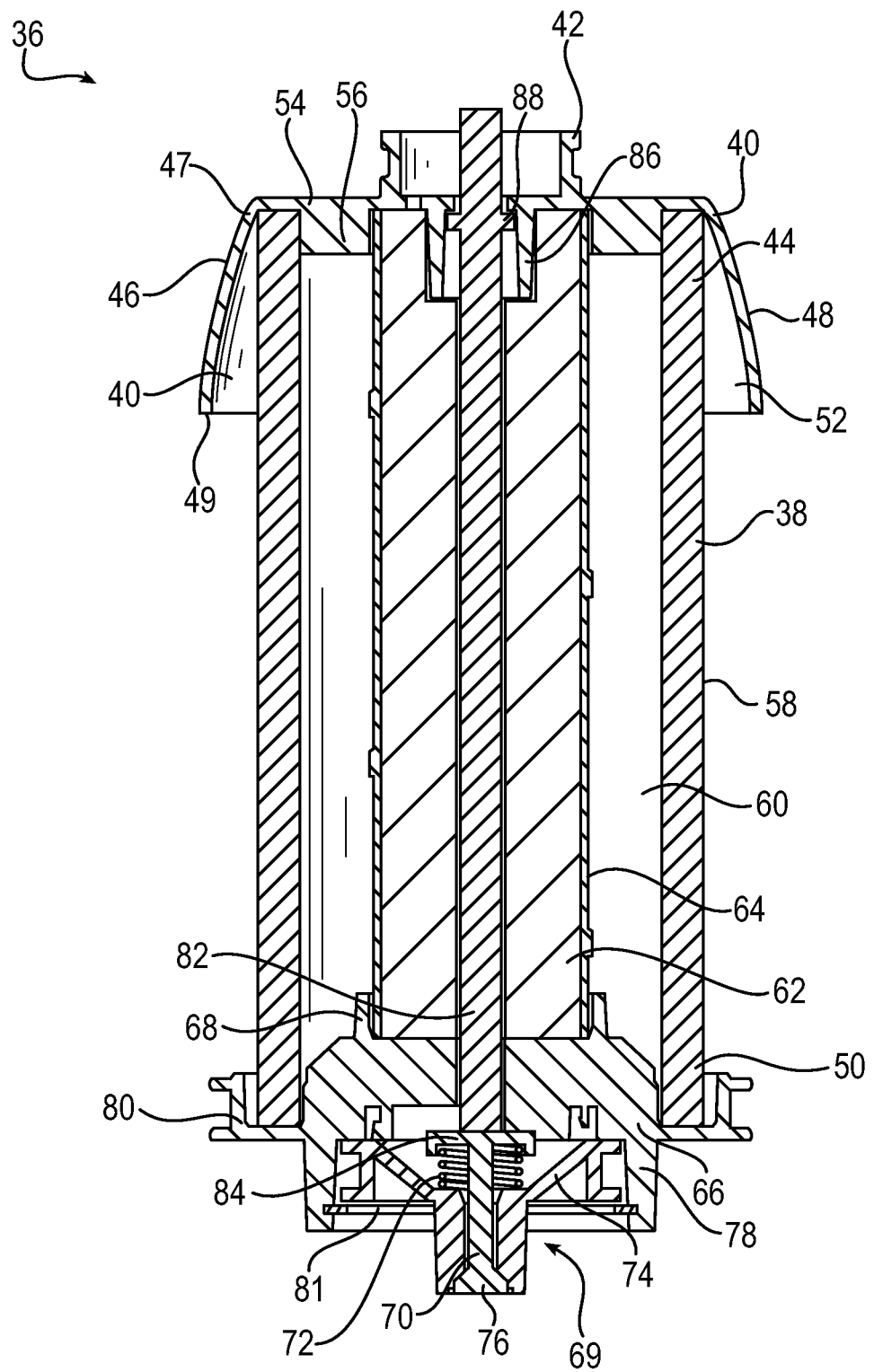
FIG. 3 is a drawing depicting a cross-sectional view of the filter element in FIG. 2.

Referring in addition to FIG. 3, the outer annular surface 48 of the shroud 46 is spaced radially outwardly from the body of coalescing media 38, defining a recess 52 between the outer annular surface 48 and the body of coalescing media 38. The recess 52 increases in diameter from the first end 47 of the shroud 46 toward the second end 49 of the shroud. The outer annular surface 48 may be convexed in the longitudinal direction. The shroud 46 may be mushroom-shaped or frustoconical. The shroud 46 also has a planar surface 54 that extends radially outwardly from the central body portion 42 to the outer annular surface 48. The planar surface 54 may have at least one axially extending surface 56 that are received within the body of coalescing media 38 for further securing the shroud 46 to the first end 44 of the body of coalescing media 38. The axially extending surface 56 may be a wall that is annular. The wall may be thin. The axially extending surface 56 may be a plug.

Figure 4:
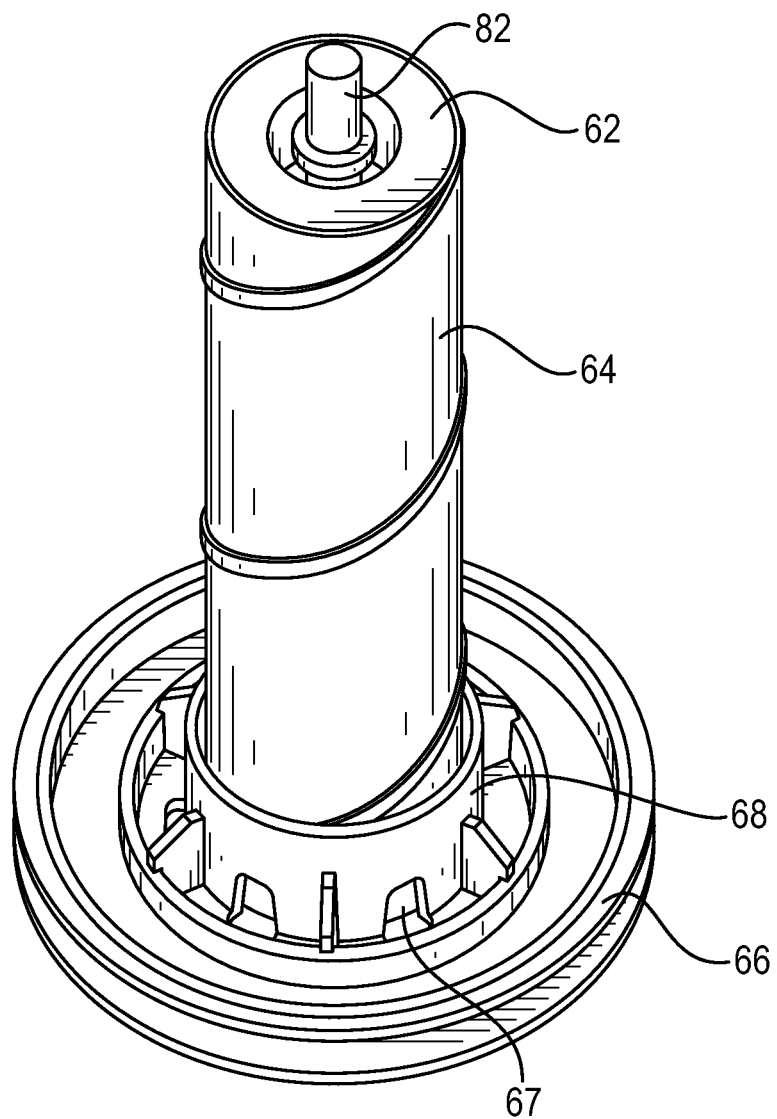
FIG. 4 is a drawing depicting a perspective view of a desiccant body of the filter element in FIG. 3.

The body of coalescing media 38 may be tubular. The body of coalescing media 38 may be pleated or have any shape suitable for use within the filter assembly 10. The body of coalescing media 38 may have an outer wall 58 circumscribing a central cavity 60. Referring in addition to FIG. 4, the filter element 36 further includes a longitudinal desiccant body 62 extending through the central cavity 60 between the first end 44 and the second end 50 of the body of coalescing media 38. The desiccant body 62 has a top end at the first end 44 and a bottom end at the second end 50. The desiccant body 62 may be surrounded by a steel tube 64. When liquid is separated from the vortex, the separated liquid and air flows downwardly through the central cavity 60 from the first end 44 to the second end 50 of the body of coalescing media 38. The filtered air can then enter the desiccant body 62 at the second end 50 for drying. The filter element 36 further includes a second end cap 66 at the second end 50 of the body of coalescing media 38 that defines a fluid passage 67. The fluid passage 67 allow oil-free air to wrap around a bottom end of the desiccant body 62 and the steel tube to enter the desiccant body 62 at the bottom end of the desiccant body 62. The separated oil does not reach the desiccant body 62. The second end cap 66 may further include an axially extending rim 68 that extends from the second end cap 66 within the central cavity 60 for supporting the desiccant body 62, the tube 64, and the elongated valve operator 82 within the body of coalescing media 38.

The second end cap 66 also includes a purge valve assembly 69 for draining the filtered water and oil from the filter assembly 10. The purge valve assembly 69 is housed in the purge port 32 of the filter housing 14 and includes a purge valve 70. The purge valve 70 is biased by a spring 72 to a closed position and is moveable to an open position for draining the liquid. The purge valve 70 may be a poppet style valve. The purge valve assembly 69 also includes a sump 74 for holding or retaining the liquid within the filter assembly 10 when the purge valve 70 is in the closed position. The sump 74 may be cone-shaped. The separated liquid is deposited in the sump 74. The purge valve assembly 69 further includes a valve seat 76 defined by the sump 74 against which the purge valve 70 is seated when in the closed position. The sump 74 directs the collected oil and water to a mouth of the purge valve 70. The second end cap 66 further includes a central body portion 78 in which the purge valve assembly 69 is contained. The second end cap 66 also has a radially extending flange 80 for attaching the second end cap 66 to the second end 50 of the body of coalescing media 38. The second end cap 66 may also have a snap ring 81 for securing the purge valve assembly 69 within the second end cap 66.

The purge valve 70 may be actuated by an elongated valve operator 82 that axially extends through the desiccant body 62 between the first end 44 and the second end 50 of the body of coalescing media 38. The valve operator 82 is configured to move the purge valve 70 to the open position when the valve operator 82 is depressed. The valve operator 82 may protrude from the desiccant body 62 at the second end 50 of the body of coalescing media 38. The valve operator 82 engages a head 84 of the purge valve 70 through the second end cap 66 at the second end 50 of the body of coalescing media 38. The valve operator 82, the desiccant body 62, and the body of coalescing media 38 may be concentrically positioned about a longitudinal axis of the filter assembly 10.

Figure 5:
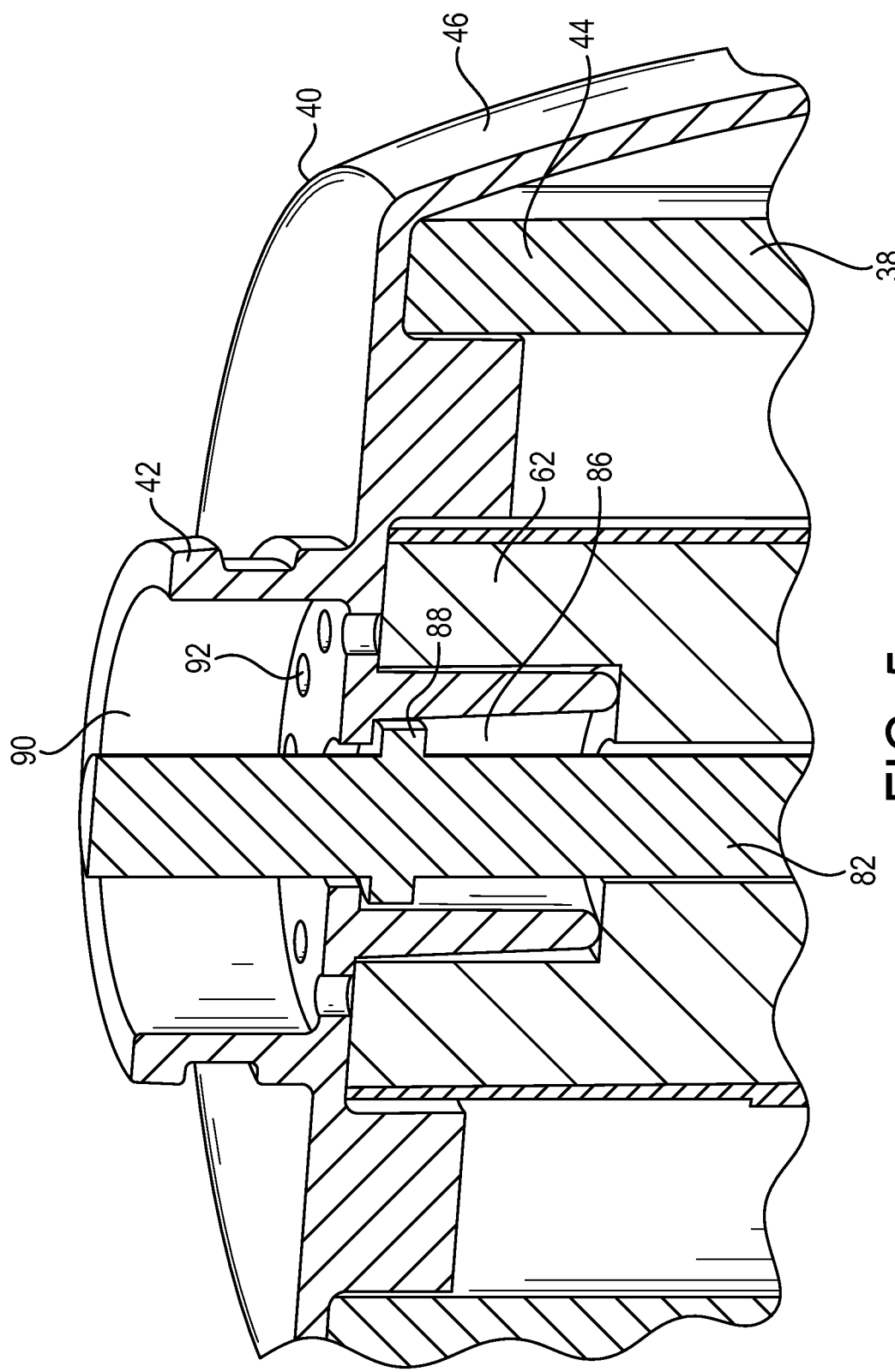
FIG. 5 is a drawing depicting a cross-sectional view of an endcap of the filter element in FIG. 3.

Referring in addition to FIG. 5, the valve operator 82 may also protrude from the top end of the desiccant body 62 at the first end 44 of the body of coalescing media 38. The valve operator 82 may extend through and further protrude from the central body portion 42 of the first end cap 40. The central body portion 42 may define an axially extending chamber 86 that extends into the desiccant body 62. The chamber 86 and the desiccant body 62 may be coaxial. The valve operator 82 may include a radially extending limit stop 88 that travels within the chamber 86 such that the chamber 86 defines the movement of the valve operator 82. The central body portion 42 may define a fluid outlet 90 and at least one outlet passage 92 in fluid communication with the desiccant body 62. The at least one outlet passage 92 may include a plurality of outlet passages and allows the filtered and dried air to flow out of the desiccant body 62 and into the fluid outlet 90. The fluid outlet 90 may be in fluid communication with the filter head 12 for outputting the filtered air from the filter element 36.

Figure 6:
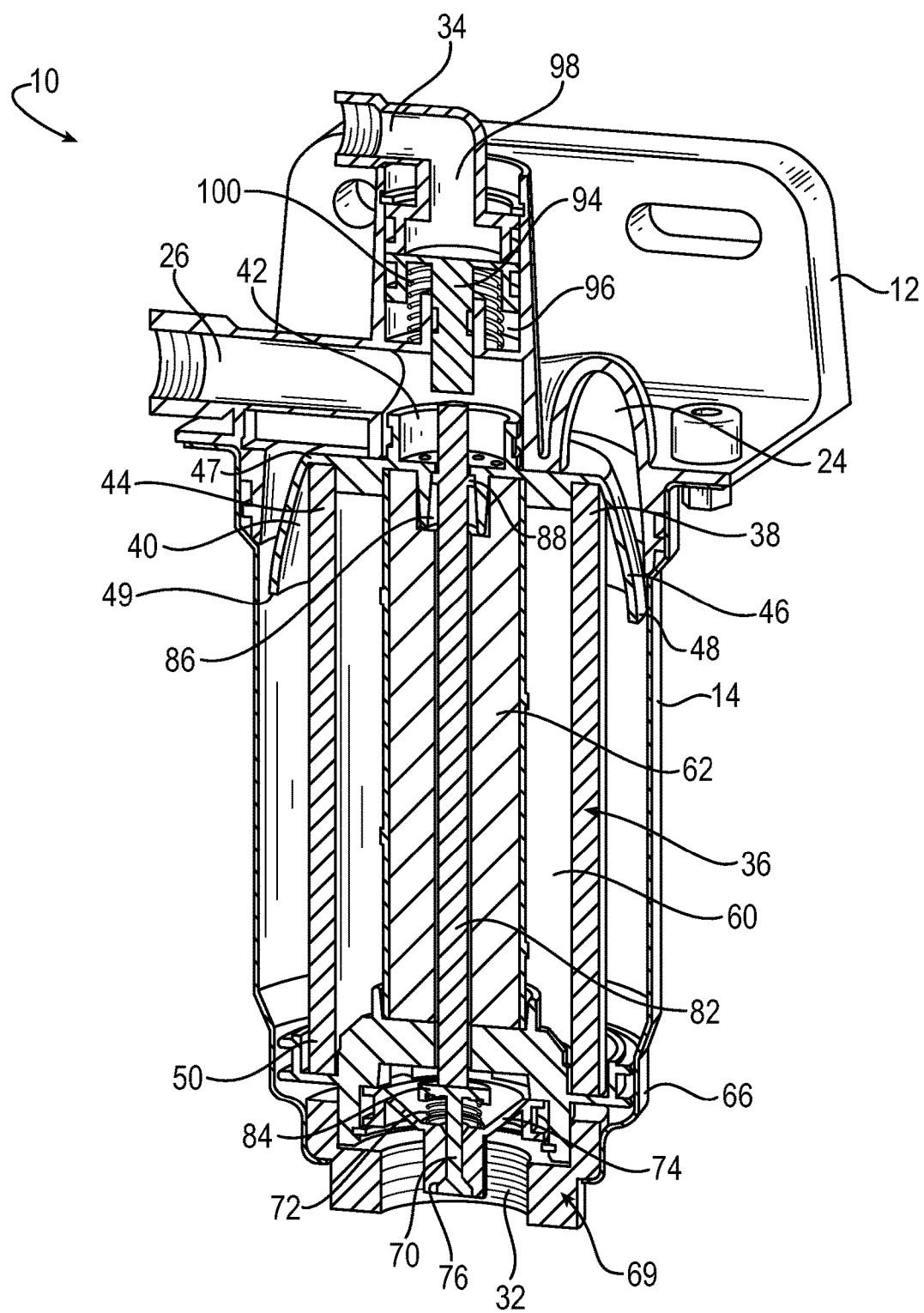
FIG. 6 is a drawing depicting a cross-sectional view of the filter assembly in FIG. 1.

Referring now to FIG. 6, a filter assembly 10 includes a filter head 12 and a filter housing 14 receiving a filter element 36. FIG. 6 shows the entire filter assembly in cross-section, and therefore like components are identified by like reference numerals in FIGS. 1-6. The filter head 12 includes a spiral-shaped fluid inlet 24 and a fluid outlet 26. Fluid enters the filter assembly 10 via the fluid inlet 24. The fluid is compressed by a compressor (not shown) that outputs a fluid containing a mixture of air, oil, and water. The filter element 36 may be a replaceable element and is cartridge-like for inserting the filter element 36 within the filter housing 14 and removing the filter element 36 for servicing and replacement. The filter element 36 has a longitudinally extending body of coalescing media 38 having a first end 44 and a second end 50 distally opposite the first end 44. The filter element 36 has a top end cap 40 that has a central body portion 42 fixed to the first end 44 of the body of coalescing media 38. The top end cap 40 has a shroud 46 that extends longitudinally from the central body portion 42 and has a radially outer annular surface 48 that progressively increases in diameter from the first end 47 toward the second end 49 of the shroud 46. The shroud 46 is configured to reduce a flow area of the entering stream of compressed fluid to induce a vortex of fluid. The vortex swirls around the body of coalescing media 38, between the filter housing 14 and the body of coalescing media 38.

The body of coalescing media 38 is tubular and has an outer wall circumscribing a central cavity 60. A desiccant body 62 extends axially through the central cavity 60 between the first end 44 and the second end 50 of the body of coalescing media 38. The separated liquid and filtered air travels within the central cavity 60 from the first end 44 toward the second end 50. The filtered air enters the desiccant body 62 at the second end 50 to be dried. Once the filtered air has traveled to the top of the desiccant body 62, the filtered air passes through a plurality of o-ring passages 92 defined in the top end cap 40. The filtered air is then outputted from the filter assembly 10 through a fluid outlet 26 having sealed fluid communication with the plurality of o-ring passages 92, to be used in a brake system. The fluid outlet 26 may include a check valve assembly (not shown).

The liquid is drained from the fluid assembly 10 via a purge valve assembly 69 located at the second end 50 of the body of coalescing media 38. The purge valve assembly 69 is housed in a purge port 32 of the filter housing 14 and includes a purge valve 70. The purge valve 70 is biased by a spring 72 to a closed position and is moveable to an open position for draining the liquid. The purge valve assembly 69 also includes a sump 74 for retaining the liquid within the filter assembly 10 when the purge valve 70 is in the closed position. The sump 74 may be cone-shaped. The purge valve assembly 69 further includes a valve seat 76 defined by the sump 74 against which the purge valve 70 is seated when in the closed position. The purge valve assembly 69 may be contained in a bottom end cap 66 of the filter element 36 located at the second end 50 of the body of coalescing media 38.

The purge valve 70 is actuatable by an elongated valve operator 82 that axially extends through the desiccant body 62 between the first end 44 and the second end 50 of the body of coalescing media 38. The valve operator 82 is configured to move the purge valve 70 to the open position when the valve operator 82 is depressed. The valve operator 82 may protrude from the desiccant body 62 at the first end 44 and the second end 50 of the body of coalescing media 38. The valve operator 82 engages the head 84 of the purge valve 70 at the second end 50. The valve operator 82, the desiccant body 62, and the body of coalescing media 38 may be positioned concentrically about a longitudinal axis of the filter assembly 10. The valve operator 82 and the purge valve 70 may also be replaceable when replacing the filter element 36 in the filter assembly 10.

The valve operator 82 is configured to move the purge valve 70 between the closed position and the open position. The valve operator 82 is moveable by an actuating piston 94 located in the filter head 12, distally opposite the purge valve assembly 69. The actuating piston 94 moves the purge valve 70 by acting on the valve operator 82, in response to the elevated pressure signal communicated by the compressor (not shown) to the governor control port 34 in the filter assembly 10. The filter head 12 includes an atmospheric reference chamber 96 in which the actuating piston is axially moveable and that is separated from the governor control port 34 by the actuating piston 94. When the compressor sends a signal that the pressurized air in the filter assembly 10 is at a maximum pressure, the governor control port 34 is filled with compressed air. The elevated pressure acts upon the piston 94. The piston 94 is then depressed against the atmospheric reference chamber 96 and a piston return spring 100. The piston return spring 100 is compressed with the spring 72 of the purge valve assembly 69. The piston return spring 100 returns the piston 94 to its normal position when the pressure signal at the governor control port 34 is removed. The piston 94 is depressed to move the valve operator 82 against the force of the return spring 100 and the spring 72 and open the purge valve 70 to drain the liquid from the filter assembly 10. A radially extending limit stop 88 limits the return travel of the operator 82. The limit stop 88 also retains the operator from unintended removal from the first end cap 40 when the filter element 36 is not installed within the filter assembly 10. The drained liquid is emitted to the surrounding environment of the vehicle.

A filter element for separating a liquid from a compressed fluid stream that flows into the filter element includes a longitudinally extending body of coalescing media having a first end and a second end distally opposite the first end, and a first end cap having a central body portion fixed to the first end of the body of coalescing media. The first end cap has a shroud that extends longitudinally from the central body portion and has a radially outer annular surface that progressively increases in diameter from a first end of the shroud to a second end of the shroud in a direction toward the second end of the of body of coalescing media. The shroud is configured to reduce a flow area of the fluid stream flowing into the filter element to induce a vortex of the fluid around the body of coalescing media, allowing the liquid to separate from the vortex.

The outer annular surface may be spaced radially outwardly from the body of coalescing media or convexed in the longitudinal direction. The shroud may be mushroom-shaped or frustoconical. The shroud may have a planar surface extending radially outwardly from the central body portion to the outer annular surface.

The filter element may be inserted into a tubular housing such that the vortex is trapped between the tubular housing and the body of coalescing media. The annular surface of the shroud may flare radially outwardly from the body of coalescing media toward the tubular housing.

The body of coalescing media may be tubular and have an outer wall circumscribing a central cavity. The filter element may include a longitudinal desiccant body axially extending through the central cavity. The central body portion of the first endcap may define at least one outlet passage in fluid communication with the desiccant body that allows the filtered air to flow out of the desiccant body through the at least one outlet passage.

The filter element may include a second end cap at the second end of the body of coalescing media that has a purge valve biased in a closed position that is moveable to an open position to drain the liquid out of the filter assembly. The filter element may further include an elongated valve operator axially extending through the body of coalescing media between the first end and the second end. The valve operator may be configured to move the purge valve to the open position when the valve operator is depressed.

The filter element may be included in a filter assembly that has a spiral-shaped fluid inlet such that the shroud is configured to reduce the flow area of the fluid stream from the fluid inlet into the filter element, to induce the vortex of the fluid.

A filter element for separating and removing a liquid from a fluid includes a longitudinally extending body of coalescing media for separating the liquid from the fluid having a top end and a bottom end distally opposite the top end, and a purge valve assembly at the bottom end of the body of coalescing media, wherein the purge valve assembly has a purge valve biased in a closed position and moveable to an open position to drain the liquid out of the filter assembly.

The purge valve assembly may include a sump for holding the liquid when the purge valve is in the closed position, and a valve seat defined by the sump against which the purge valve is seated when in the closed position. The filter element may further include an elongated valve operator axially extending through the body of coalescing media between the top end and the bottom end, such that the elongated valve operator is configured to move the purge valve between the closed position and the open position.

A filter assembly for separating and removing a liquid from a fluid includes a filter head having a fluid inlet and an actuating piston, a longitudinal filter element for separating the liquid from the fluid that has a first end in fluid communication with the fluid inlet and a second end distally opposite the first end, a purge valve at the second end of the filter element distally opposite the filter head that is biased in a closed position and moveable to an open position for draining the liquid out of the filter assembly, and an elongated valve operator that axially extends through the filter element between the first end and the second end and is configured to move the purge valve between the closed position and the open position. The actuating piston is configured to move the purge valve by acting on the valve operator, in response to elevated pressure in the filter assembly.

The filter head may include an atmospheric reference chamber in which the actuating piston is moveable and that is configured to detect when the filter assembly has elevated pressure. The filter head may include a governor pressure chamber that is separated from the atmospheric reference chamber by the actuating piston, such that the piston moves when elevated pressure is communicated to the governor pressure chamber.

The fluid inlet may be spiral-shaped and the filter element may be configured to reduce a flow area of fluid entering the filter element from the fluid inlet, to induce a vortex of the fluid. The filter assembly may include a shroud at the first end of the filter element that extends longitudinally from a first end toward a second end of the shroud and has a radially outer annular surface that progressively increases in diameter from the first end toward the second end of the shroud, such that the shroud is configured to induce the vortex and accelerate a speed of the vortex, allowing the liquid to separate from the vortex. The shroud may include at least one outlet passage at the first end of the filter element allowing filtered air to exit the filter element. The filter head may include a fluid outlet in fluid communication with the at least one outlet passage at the first end of the filter element.

The filter element may further include a sump at the second end of the filter element and a valve seat defined by the sump, such that the purge valve is biased against the valve seat when in the closed position.

The filter element may include a longitudinal body of coalescing media circumscribing a central cavity, and a longitudinal desiccant body within the central cavity. The elongated valve operator may extend through the desiccant body and protrudes from the desiccant body at the first end and the second end of the filter element.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter assembly comprising:
    a filter head that defines a spiral-shaped fluid inlet and has an actuating piston; and
    a filter element comprising:
        a longitudinally extending body of coalescing media having a first end and a second end distally opposite the first end; and
        a first end cap having a central body portion fixed to the first end of the body of coalescing media, and a shroud that extends longitudinally from the central body portion and has a radially outer annular surface that progressively increases in diameter from a first end of the shroud to a second end of the shroud in a direction toward the second end of the of body of coalescing media,
    wherein the shroud is configured to reduce a flow area of the fluid stream flowing into the filter element from the fluid inlet to induce a vortex of the fluid around the body of coalescing media, allowing the liquid to separate from the vortex.

2. The filter assembly according to claim 1, wherein the outer annular surface is spaced radially outwardly from the body of coalescing media.

3. The filter assembly according to claim 1, wherein the shroud has a planar surface extending radially outwardly from the central body portion to the outer annular surface.

4. The filter assembly according to claim 1, wherein the outer annular surface is convexed in the longitudinal direction.

5. The filter assembly according to claim 1, wherein the shroud is frustoconical.

6. The filter assembly according to claim 1, wherein the body of coalescing media is tubular and has an outer wall circumscribing a central cavity.

7. The filter assembly according to claim 6 further comprising:
    a longitudinal desiccant body axially extending through the central cavity.

8. The filter assembly according to claim 7, wherein the central body portion of the first endcap defines at least one outlet passage in fluid communication with the desiccant body that allows the filtered air to flow out of the desiccant body through the at least one outlet passage.

9. The filter assembly according to claim 1 further comprising
    a tubular housing, wherein the filter element is inserted into a tubular housing and the vortex is trapped between the tubular housing and the body of coalescing media.

10. The filter assembly according to claim 9, wherein the annular surface of the shroud flares radially outwardly from the body of coalescing media toward the tubular housing.

11. The filter assembly according to claim 9 further comprising:
    a purge valve at the second end of the body of coalescing media distally opposite the filter head that is biased in a closed position and moveable to an open position for draining the liquid out of the filter assembly.

12. The filter assembly according to claim 11 further comprising:
    an elongated valve operator that axially extends through the body of coalescing media between the first end and the second end and is configured to move the purge valve between the closed position and the open position, wherein the actuating piston is configured to move the purge valve by acting on the valve operator, in response to elevated pressure in the filter assembly.

13. A filter element for separating a liquid from a compressed fluid stream that flows into the filter element, the filter element comprising:
    a longitudinally extending body of coalescing media having a first end and a second end distally opposite the first end;
    a first end cap having a central body portion fixed to the first end of the body of coalescing media, and a shroud that extends longitudinally from the central body portion and has a radially outer annular surface that progressively increases in diameter from a first end of the shroud to a second end of the shroud in a direction toward the second end of the of body of coalescing media, wherein the shroud is configured to reduce a flow area of the fluid stream flowing into the filter element to induce a vortex of the fluid around the body of coalescing media, allowing the liquid to separate from the vortex; and
    a second end cap at the second end of the body of coalescing media having a purge valve that is biased in a closed position and moveable to an open position to drain the liquid.

14. The filter element according to claim 13 further comprising:
    an elongated valve operator axially extending through the body of coalescing media between the first end and the second end, wherein the valve operator is configured to move the purge valve to the open position when the valve operator is depressed.

15. A filter assembly comprising:
   the filter element according to claim 13; and
   a spiral-shaped fluid inlet, wherein the shroud is configured to reduce the flow area of the fluid stream from the fluid inlet into the filter element, to induce the vortex of the fluid.

16. The filter element according to claim 13 further comprising:
   a sump for holding the liquid when the purge valve is in the closed position; and
   a valve seat defined by the sump against which the purge valve is seated when in the closed position.

17. The filter assembly according to claim 15 further comprising:
   a filter head defining the spiral-shaped fluid inlet and having an actuating piston.

18. The filter assembly according to claim 17, wherein the filter head includes an atmospheric reference chamber and a governor pressure chamber that are separated by the actuating piston, wherein the actuating piston is moveable within the atmospheric reference chamber when elevated pressure is communicated to the governor pressure chamber.

19. A filter element for separating a liquid from a compressed fluid stream that flows into the filter element, the filter element comprising:
   a longitudinally extending body of coalescing media having a first end and a second end distally opposite the first end;
   a shroud at the first end of the body of coalescing media that extends longitudinally from a first end toward a second end of the shroud and has a radially outer annular surface that progressively increases in diameter from the first end toward the second end of the shroud, wherein the shroud is configured to reduce a flow area of a fluid stream flowing into the filter element to induce a vortex of the fluid around the body of coalescing media, allowing the liquid to separate from the vortex;
   a purge valve at the second end of the body of coalescing media that is biased in a closed position and moveable to an open position; and
   an elongated valve operator axially extending through the body of coalescing media between the first end and the second end, wherein the valve operator is configured to move the purge valve to the open position when the valve operator is depressed.

* * * * *